(12) United States Patent
LaSalle (10) Patent No.: US 11,583,094 B2
(45) Date of Patent: Feb. 21, 2023

(54) METHOD AND APPARATUS FOR HOLDING A BOOK OR OTHER HANDHELD OBJECT

(71) Applicant: Daniel LaSalle, San Diego, CA (US)

(72) Inventor: Daniel LaSalle, San Diego, CA (US)

(*) Notice: Subject to any disclaimer, the term of this patent is extended or adjusted under 35 U.S.C. 154(b) by 43 days.

(21) Appl. No.: 17/326,192

(22) Filed: May 20, 2021

(65) Prior Publication Data
US 2022/0369819 A1 Nov. 24, 2022

(51) Int. Cl.
| | |
|---|---|
| *A47C 7/70* | (2006.01) |
| *A47C 7/68* | (2006.01) |
| *B60N 3/00* | (2006.01) |
| *A47B 23/00* | (2006.01) |
| *B64D 11/06* | (2006.01) |
| *A47C 20/02* | (2006.01) |

(52) U.S. Cl.
CPC ............... *A47C 7/705* (2018.08); *A47C 7/70* (2013.01); *A47B 23/00* (2013.01); *A47C 20/028* (2013.01); *B60N 3/004* (2013.01); *B64D 11/0638* (2014.12); *B64D 11/0647* (2014.12)

(58) Field of Classification Search
CPC .. A47C 7/705; A47C 7/70; A47C 7/68; A47C 7/386; A47C 20/028; A47C 4/28; A47B 23/00; B60N 2/60; B64D 11/0647; B64D 11/0638
See application file for complete search history.

(56) References Cited

U.S. PATENT DOCUMENTS

| | | | | |
|---|---|---|---|---|
| 3,050,355 | A | * 8/1962 | Hess | ...................... B60N 3/004 108/146 |
| 6,142,561 | A | 11/2000 | Pesta et al. | |
| 6,820,852 | B2 | * 11/2004 | Wainscott | .............. A47B 23/00 5/636 |
| 6,830,292 | B1 | * 12/2004 | Yoda | ...................... B60N 3/004 297/188.05 |
| 7,281,762 | B1 | 10/2007 | Getfield | |
| 7,458,555 | B2 | 12/2008 | Mastropaolo et al. | |
| 7,758,009 | B1 | 7/2010 | Chang | |
| 8,047,613 | B1 | 11/2011 | Ahad | |
| 8,424,825 | B2 | 4/2013 | Somuah | |
| 8,523,133 | B2 | 9/2013 | McKellar | |
| 8,651,445 | B2 | 2/2014 | Lee | |
| 9,226,584 | B2 | 1/2016 | Swy | |
| 9,457,725 | B2 | 10/2016 | McClain et al. | |
| 9,481,465 | B2 | 11/2016 | Pajic | |
| 9,610,879 | B2 | 4/2017 | Zheng et al. | |
| 10,112,360 | B2 | 10/2018 | Casagrande | |
| 10,449,882 | B2 | * 10/2019 | Lev | ...................... B61D 33/005 |
| 10,703,482 | B1 | 7/2020 | Puglisi et al. | |
| 10,836,284 | B1 | * 11/2020 | Mizera | ................. A47G 11/004 |

(Continued)

FOREIGN PATENT DOCUMENTS

KR 890001999 4/1989

*Primary Examiner* — Syed A Islam
(74) *Attorney, Agent, or Firm* — Jaquez Land Greenhaus & McFarland LLP; Bruce W. Greenhaus, Esq.

(57) ABSTRACT

A method and apparatus for holding a book or other handheld object is disclosed. The book holder comprises an encasement portion and a book holder support platform attached thereto. The book holder support platform may be vertically lowered or raised to fit the needs of the user. The encasement portion comprises material that easily stretches over or around a seatback or other substantially vertically upright support structure.

17 Claims, 4 Drawing Sheets

(56) References Cited

U.S. PATENT DOCUMENTS

| | | | |
|---|---|---|---|
| 11,213,130 B2 * | 1/2022 | Cotterell | B64D 11/0647 |
| 2005/0056762 A1 | 3/2005 | Martin et al. | |
| 2008/0047992 A1 | 2/2008 | Fabian | |
| 2014/0284972 A1 | 9/2014 | Riedel et al. | |
| 2016/0007735 A1 | 1/2016 | Gallup et al. | |
| 2017/0291710 A1 | 10/2017 | Barr-Perea et al. | |
| 2019/0276150 A1 | 9/2019 | Cotterell | |

* cited by examiner

METHOD AND APPARATUS FOR HOLDING A BOOK OR OTHER HANDHELD OBJECT

BACKGROUND

(1) Technical Field

The presently disclosed method and apparatus is related to book holders and other apparatus that are used to hold books, or to hold other handheld objects or devices, for use by a reader of the book or by a user of the handheld object or device. The presently disclosed apparatus is used to hold a book, or other handheld object, for a user and thereby freeing the user's hands to perform tasks that would otherwise be needed to hold the book or other handheld object. Exemplary handheld devices might include, without limitation, an iPad®, a Kindle®, or other similar electronic devices that a user might use to read written information or otherwise access information.

(2) Background

Book readers and others that use handheld devices have long desired a portable book holder that would free their hands to perform other tasks while reading books, notes, etc. Often books and notes are taken to lunchrooms, restaurants, offices, conference rooms, schools, etc. and many other places. Readers desire a portable, easy to use, book holder that will allow the readers to use their hands to eat or perform other functions using their hands.

There are a number of related book holder art. For example, U.S. Pat. No. 8,523,133 describes a collapsible book holder. The book holder is portable, collapsible, and it is designed to hold a book open for reading. Disadvantageously, the book holder is meant to lie on a fairly flat or entirely flat surface. U.S. Pat. No. 8,651,445 describes a portable book holder that can be converted from its original size into a small size for portability. Similarly, a full folding book stand is disclosed in U.S. Pat. No. 7,758,009. The folding book stand is described as being positioned on a table top or other fairly flat surface. U.S. Pat. No. 9,226,584 discloses a folding book holder for a seat. The book holder is stored in a bottom portion of the seat, and during use, the book holder is taken out of the storage area for use by the reader.

Other relevant art include published U.S. Pat. No. 10,112,360 B2 for an "Apparatus for supporting a portable device for seat back viewing". This patent discloses an apparatus for supporting a tablet for seatback viewing, including a generally flat tablet engaging portion, a generally flat seat engaging portion extending therefrom; and a support shelf operationally connected to the tablet engaging portion. Other potentially relevant art include published US Application No. US20190276150A1 for a "Headrest Cover Holder System". The application describes a headrest cover holder system having a sleeve configured to be removably installed on a headrest of a seat on a passenger-vehicle. The sleeve includes an electronic device mount allowing a passenger to mount an electronic-device to a rear-side of the headrest. Adjustable angle settings may be included for optimized comfort during use.

Other potentially relevant art includes U.S. Pat. No. 9,945,722 B2 for a seatback-mountable holder for a portable electronic device. U.S. Pat. No. 9,945,722 describes a holder for removably attaching a portable electronic device to an elongate support such as a tray table latch on a seatback. The holder may comprise a stowable tray table comprising a clamp frame, a spring compression lever slidably attached to the clamp frame, a flexible band for suspending the clamp frame from the elongate support and a self-centering clamp for gripping opposite sides of the elongate support. The holder may optionally include a device adapter for attaching a selected electronic device.

U.S. Pat. No. 7,281,762 discloses portable platforms and methods of use of same. The patent discloses portable platform assemblies, such as, for example, a tray, desk, or shelf, that are provided for placement on the backrests of chairs or seats or similarly vertical surfaces. The tray or shelf assembly can be extended, as well as be adjusted to a variety of angles useful for writing, reading, eating or other uses. Published US Application No. US20170291710A1 discloses a cloth tray cover for use on airplanes and in airplane seats in particular. The application discloses a cloth tray cover and accessories which can be used on tray tables found on airplanes or trains, and with tray tables in some cars. The tray cover includes pockets allowing the tray cover to accommodate both small and large personal items that travelers want to have handy. The tray cover can be sized and altered to fit any type of tray table.

U.S. Pat. No. 7,458,555 B2 discloses a multi-positional universal book holder. In one embodiment, as described in U.S. Pat. No. 7,458,555, the book holder includes a tray for holding a book, a ball joint and swivel assembly connected between the back of the tray and one end of a gooseneck, and a C-clamp connected to the other end of gooseneck. The book holder can be attached to an arm of indoor and outdoor furniture and the tray is rotatable to accommodate the reader's desires.

As is evident from a brief review of the above-described potentially relevant disclosures found in the art, many different designs and types of book holders have been disclosed and attempted. However, none of the book holders in the documents cited above disclose a book holder which is portable, easy to use, and has an adjustable book support that allows a book or other handheld object that is placed in the holder to be easily adjusted to a comfortable reading position.

Therefore, there is a need for a method and apparatus for holding a book or other handheld object for use by a reader or other user which is portable and easy to use. There is also need for such a book holder to have an adjustable book support that is easily adjustable by a user of the book holder. The adjustable book support allows a user to adjust the book or other object held by the book holder to a position that is comfortable or convenient for use by the user.

The present a method and apparatus for holding a book or other handheld object for use by a reader or other user satisfy the above-described needs.

SUMMARY

A method and apparatus are disclosed for holding a book or other hand-held object. In some embodiments, the method and apparatus comprise an encasement portion and a book holder support platform attached to the encasement portion. The encasement portion comprises a fabric that allows the encasement portion to be positioned over and around a seatback or other vertically upright apparatus. This positioning keeps the book holder firmly in place with the seatback or other vertically upright apparatus. In some embodiments, the book holder support platform is hingeably attached to a user-facing side of the encasement portion to allow easy access to a user. The user can adjust both the height and viewing angle of the book holder support platform as needed by adjusting positions of attachment of the platform to the encasement portion. The encasement portion may be proportioned to accommodate a wide variety of seatbacks of differing sizes and proportions. The book holder support platform may include a ledge to prevent the book or other hand-held object from slipping or dropping from the book holder support platform during use. In some embodiments the book holder support platform is detachably attached to a "rail system" affixed to the user-facing side of the encasement portion. In these embodiments, a rail is vertically affixed to the user facing side of the encasement portion, and the book holder support platform is raised or lowered by moving the book holder support platform up or down along different segments of the "rail." Alternatively, the book holder support platform may be affixed to the rail, and the rail may be lowered or raised as desired by the user. In some embodiments, the apparatus is portable and easily stored.

The details of one or more embodiments of the invention are set forth in the accompanying drawings and the description below. Other features, objects, and advantages of the invention will be apparent from the description and drawings, and from the claims.

DESCRIPTION OF THE DRAWINGS

FIG. 3b shows a simplified user-facing view of the apparatus for holding a book or other hand-held object of FIG. 3a.

Like reference numbers and designations in the various drawings indicate like elements.

DETAILED DESCRIPTION

Aspects of the present disclosure relate to a method and apparatus for holding a book or other handheld object for use by a reader or user. Details of some disclosed embodiments are described below with reference to the accompanying figures.

The disclosed method and apparatus for holding a book or other hand-held object, in accordance with the present disclosure, are designed to be easily accessible means for users or readers to be able to read a book or use a hand-held object "hands free". In some embodiments, the apparatus is portable and easily stored. In these embodiments the apparatus is not meant to be fixed "in-place". The apparatus may conveniently be used with a number of different seatbacks or other similar vertically upright structure. In some embodiments, the book holder apparatus includes an encasement portion that is designed to encase, or wrap around, a seatback, or other substantially vertically upright structure or apparatus. The encasement portion of the book holder apparatus may comprise any convenient material that is designed to attach to, or completely envelop a seatback or other vertically upright structure. In one embodiment, for example, the encasement portion is made of material that "stretches" over and around the back of a seat or similar substantially vertically upright apparatus. For example, in some embodiments, the book holder encasement portion comprises a stretch fabric that has the ability to stretch around a seatback or other substantially vertically upright apparatus and thereby hold the encasement portion and the entire book holder apparatus in place with the seatback or other apparatus during use. In some embodiments, the stretch fabric partially comprises polyether-polyurea copolymer synthetic fibers such as, for example, lycra, elastane, spandex, and other fibers having an elastane content. Natural fibers may be used in other embodiments, as long as the encasement portion can stretch to fit over the seatback or other substantially vertically upright apparatus, and fits tightly around the seatback once it is set in place and during use of the book holder.

Figure 1:
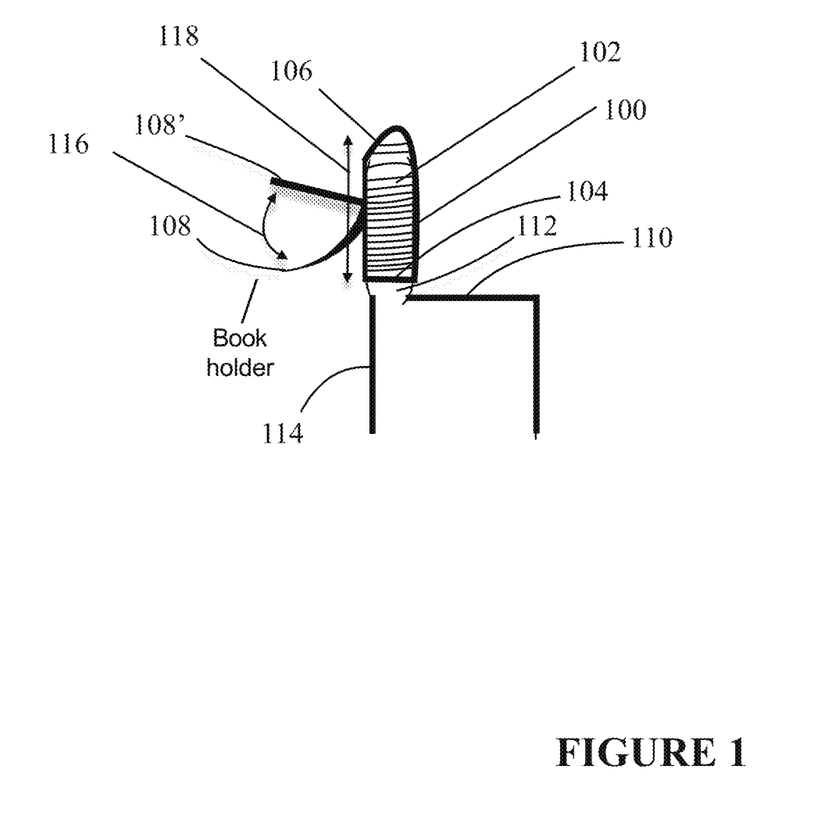
FIG. 1 shows a simplified side view of an apparatus for holding a book or other hand-held object in accordance with the present disclosure.

FIG. 1 shows a simplified side view of an apparatus for holding a book or other hand-held object (referred to herein for convenience sake as a "book holder") in accordance with the present disclosure. As shown in FIG. 1, the book holder 100 comprises an encasement portion 102 and a book holder support platform 108 attached to a front-facing side (or "user-facing" side) of the encasement portion 102. As used herein, a side of the encasement portion 102 that faces toward a user is referred to herein as "front-facing" or "user-facing", and a side of the encasement portion 102 that faces away from a user is referred to herein as "rear-facing". In some embodiments, the book holder support platform 108 may include a ledge to prevent the book or other hand-held object from slipping or dropping from the platform 108. As described in more detail with reference to FIG. 2, in some embodiments, the encasement portion 102 is guided over the top of a seatback 112 of a seat 110 or other substantially vertically upright apparatus for which it is proportioned to fit.

In use, a bottom portion 104 of the encasement portion 102 is positioned over or around the seatback 112 of the seat 110, and is pulled over the seatback 112. The encasement portion 102 is pulled down the length of the seatback 112 until a top portion 106 of the encasement portion 102 is fit snugly to the top of the seatback 112. In some embodiments, the encasement portion 102 may be custom-designed to have many different configurations and sizes so that the encasement portion 102 fits snugly around different types and sizes of seatbacks 112. In other embodiments, the encasement portion 102 may comprise two or more segments of fabric designed to be attached to each other after the segments are positioned around the seatback 112. For example, the two or more segments may be wrapped around the seatback 112 and attached together with a zipper, pieces of Velcro®, or via some other encasement segment attachment fasteners. No matter how the encasement portion 102 is designed, once positioned over or around the seatback 112, the encasement portion 102 fits snugly to and around the seatback 112. This arrangement provides a sturdy and stable surface to which the book holder support platform 108 is firmly secured in place while in use.

The book holder support platform 108 may be attached to the front-facing side 120 of the encasement portion 102 using a variety of attachment fasteners or mechanisms. For example, in some embodiments the book holder support platform 108 is attached to the encasement portion 102 via a hinged attachment mechanism. In this embodiment, the book holder support platform 108 has a front-facing side and a rear-facing side, wherein the front-facing side is designed to support a book or other hand-held object. In some embodiments, the rear-facing side may include hinged attachment mechanisms that hingeably attach the rear-facing side of the book holder support platform 108 to the front-facing side 120 of the encasement portion 102. In some embodiments, the hinged attachment mechanisms include positioning blocks that allow the book holder support platform 108 to be positioned as shown in FIG. 1 through a viewing angle 116 as desired by a user, reader, or viewer of a book or other handheld object supported by the book holder support platform 108. In some embodiments, when not in use, the book holder support platform 108 may be hingeably positioned to be substantially coplanar with the front-facing side 120 of the encasement portion 102, thereby allowing the book holder support platform 108 to be non-intrusive to the user.

As shown in FIG. 1, the book holder support platform 108 may be vertically lowered or raised (shown via an up-down arrow 118) as needed by the user. This function is accomplished in some embodiments by attaching the hinged attachment fasteners or mechanisms of the book holder support platform 108 to vertically lower or higher regions of the front-facing side 120 of the encasement portion 102. The front-facing side 120 of the encasement portion 102 may include several different attachment fasteners or mechanisms that allow the book holder support platform 108 to be hingeably attached at lower or higher heights of the front facing side 120 of the encasement portion 102 thereby allowing the user to adjust the height of the book holder support platform 108 to a desired vertical position.

In other embodiments, the book holder support platform 108 is attached to the front-facing side 120 of the encasement portion 102 using Velcro®-like attachments. In these embodiments, the rear-facing side of the book holder support platform 108 has Velcro®-like attachments that mate with similar Velcro®-like attachments affixed to the front-facing side 120 of the encasement portion 102. The front-facing side 120 may have a number of attachments that allow the book holder support platform 108 to be raised or lowered vertically (shown in FIG. 1 via the vertical double-arrow 118) to accommodate the user's needs. For example, if the user is seated, the book holder support platform 108 may be lowered by attaching the book holder support platform 108 to lower Velcro®-like attachments affixed to the front facing side 120 of the encasement portion 102. This allows the user to easily view the object held by the book holder support platform 108 when the user is seated. Alternatively, when the user stands, the book holder support platform 108 may be raised by attaching the book holder support platform 108' (the book holder support platform 108 is shown in FIG. 1 in the raised position as the book holder support platform 108') to higher Velcro®-like attachments affixed to the front facing side 120 of the encasement portion 102. This allows the user to easily view the object held by the book holder support platform 108 when the user is standing. As described below in detail with reference to FIGS. 3a and 3b, in some embodiments, the book holder support platform 108 is vertically raised or lowered along the front-facing side 120 of the encasement portion 102 using a "rail-based" system.

Figure 2:
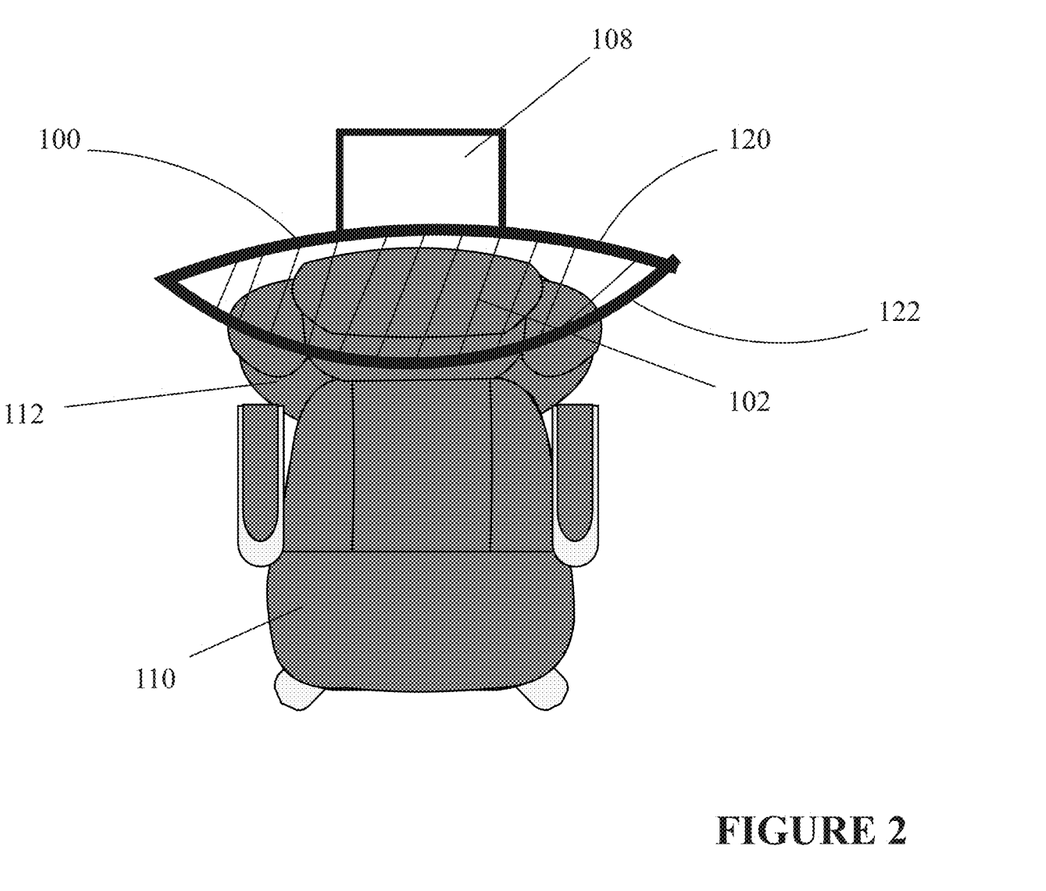
FIG. 2 is a simplified top-down view of the apparatus for holding a book or other hand-held object shown in FIG. 1.

FIG. 2 is a simplified top-down view of the book holder 100 shown in FIG. 1. As shown in FIG. 2, the book holder 100 comprises an encasement portion 102 and a book holder support platform 108. The encasement portion 102 is shown positioned above a seat 110 having a seatback 112. The encasement portion 102 has a front-facing side 120 and a rear-facing side 122. The front-facing side 120 of the encasement portion 102 has a book holder support platform 108 attached thereto as described above with reference to FIG. 1.

As described above with reference to FIG. 1, when in use, the encasement portion 102 is positioned over or around the seatback 112 of the seat 110, and is pulled over the seatback 112. The front-facing side 120 of the encasement portion 102 and the book holder support platform 108 is positioned such that they face the user of the book holder 100. The rear-facing side 122 of the encasement portion 102 is positioned around the seatback 112 and faces away from the user. As described above with reference to FIG. 1, in some embodiments, the encasement portion 102 is pulled down along the vertical length of the seatback 112 until a top portion 106 (see FIG. 1) of the encasement portion 102 fits snugly to the top of the seatback 112. In some embodiments, the encasement portion 102 may comprise two or more segments of fabric designed to be attached to each other after the segments are positioned around the seatback 112. For example, the two or more segments may comprise the front-facing side 120 and the rear-facing side 122, and they may be wrapped around the seatback 112 and attached together with a zipper, pieces of Velcro®, or via some other encasement attachment means. As described above with reference to FIG. 1, no matter how the encasement portion 102 is designed, once positioned over or around the seatback 112, the encasement portion 102 fits snugly to and around the seatback 112, thereby providing a sturdy and stable surface which holds the book holder support platform 108 firmly in place while in use. The book holder support platform 108 may be raised or lowered vertically to a position that suits the user's needs.

Figure 3A:
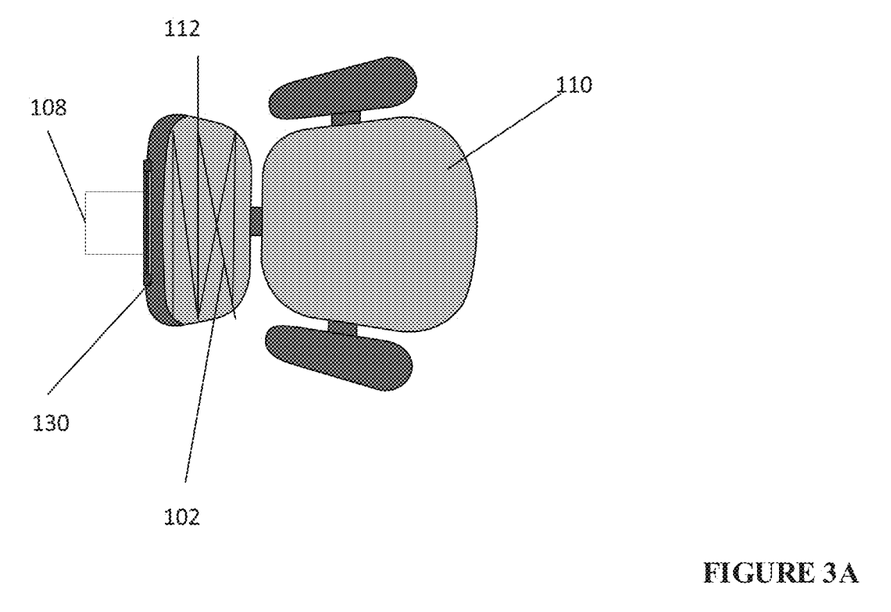
FIG. 3a shows a simplified top-down view of the apparatus for holding a book or other hand-held object wherein a "rail system" is used to raise or lower a book holder support platform along a rail that is vertically affixed to a front-facing side of the encasement portion of the book holder.
Figure 3B:
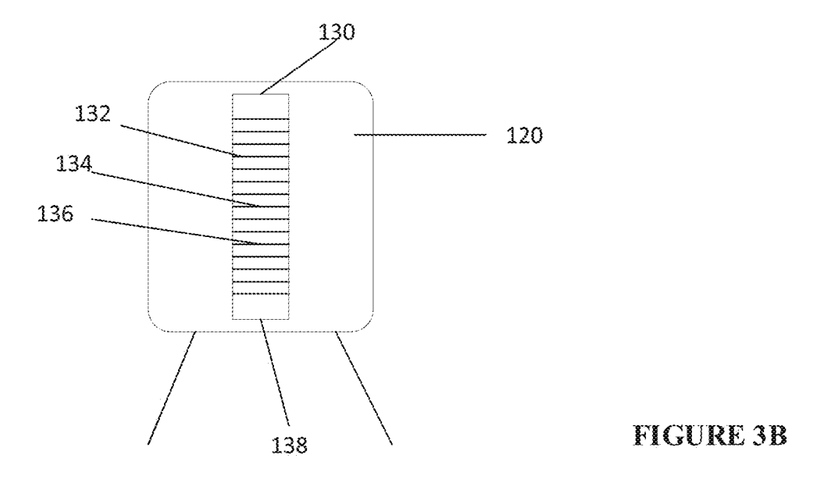

FIGS. 3a and 3b show aspects of the book holder apparatus 100 employing a "rail-based" system that allows the book holder support platform 108 to be vertically raised or lowered along the front-facing side 120 of the encasement portion 102 of the book holder 100. FIG. 3a shows a simplified top-down view of the apparatus 100 for holding a book or other hand-held object wherein a "rail system" is used to raise or lower the book holder support platform 108 along a rail that is affixed to the front-facing side 120 of the encasement portion 102. FIG. 3a shows a top-facing portion of a rail 130 rigidly attached to the front-facing side 120 of the encasement portion 102.

FIG. 3b shows a simplified user-facing view of the apparatus 100 for holding a book or other hand-held object of FIG. 3a. As shown in FIG. 3b, the rail 130 is rigidly attached to the front-facing side 120 of the encasement portion 102. In this embodiment of the apparatus 100, the rail is secured to the front-facing side 120 of the encasement portion 102 and runs vertically from a bottom section 138 of the rail 130 (proximate the bottom of a seat back when the encasement portion 102 is placed over the seat back) to a top section of the rail 130. As shown in FIG. 3b, the rail 130 comprises a plurality of rail segments (such as, for example, rail segments 132, 134 and 136). In some embodiments, during use, the book holder support platform 108 is attached to the rail 130 and is moved along the rail 130 by a user and detachably attached at a desired rail segment of the rail 130 (such as the rail segments 132, 134 and 136 shown in FIG. 3b). In this manner, the book holder support platform 108 may be vertically raised or lowered by a user to a desired vertical height. In other embodiments, the rail 130 is slidably attached to the front-facing side 120 of the encasement portion 102, and the book holder support platform 108 is rigidly attached to the rail 130. In these embodiments, the rail 130 is slid vertically (up or down) along the front-facing side 120 of the encasement portion 102 which allows the user to place the book holder support platform 108 at a desired height.

CONCLUSION

A number of advantages are offered by the present method and apparatus for holding a book or other hand-held object. In some embodiments, the method and apparatus comprise an encasement portion and a book holder support platform attached to the encasement portion. The encasement portion comprises a fabric which has the ability to stretch around a seatback or other substantially vertically upright apparatus and thereby holds the encasement portion and the entire book holder in place with the seatback or other substantially vertically upright apparatus. In some embodiments, the book holder support platform is hingeably attached to a front-facing (or user-facing) side of the encasement portion to allow easy access to a user. As needed, the user can adjust both the height and viewing angle of the book holder support platform by adjusting positions of attachment of the book holder support platform to the encasement portion. The encasement portion may be proportioned to accommodate a wide variety of seatbacks of differing sizes and proportions. The book holder support platform may include a ledge or tray to prevent the book or other hand-held object from slipping or dropping from the platform.

A number of embodiments of the invention have been described. It is to be understood that various modifications may be made without departing from the spirit and scope of the invention. For example, some of the steps described above may be order independent, and thus can be performed in an order different from that described. Further, some of the steps described above may be optional. Various activities described with respect to the methods identified above can be executed in repetitive, serial, or parallel fashion.

It is to be understood that the foregoing description is intended to illustrate and not to limit the scope of the invention, which is defined by the scope of the following claims, and that other embodiments are within the scope of the claims. In particular, the scope of the invention includes any and all feasible combinations of one or more of the processes, machines, manufactures, or compositions of matter set forth in the claims below. (Note that the parenthetical labels for claim elements are for ease of referring to such elements, and do not in themselves indicate a particular required ordering or enumeration of elements; further, such labels may be reused in dependent claims as references to additional elements without being regarded as starting a conflicting labeling sequence). It will be evident that various modifications may be made to the disclosed examples of implementations without departing from the broader spirit and scope of implementations of the disclosure as set forth in the claims that follow. Where the disclosure refers to some elements in the singular tense, more than one element can be depicted in the figures and like elements are labeled with like numerals. The disclosure and drawings are to be regarded in an illustrative sense rather than a restrictive sense.

What is claimed is:

1. An apparatus for holding a book or other handheld object for viewing by a user, the apparatus comprising:
    (a) an encasement portion comprising substantially stretch fabric, wherein the encasement portion includes a front-facing side and a rear-facing side, and wherein, during use, the encasement portion is positioned over or around a seatback or other substantially vertically upright apparatus such that the encasement portion fits snugly to the seatback or the substantially vertically upright apparatus, thereby providing a secure and stable attachment surface; and
    (b) a book holder support platform hingeably attached to the front-facing side of the encasement portion, wherein the book holder support platform provides a substantially horizontal surface upon which a book or other handheld object may be placed, and wherein the book holder support platform may be vertically raised, lowered, or tilted to a desirable viewing angle by the user.

2. The apparatus of claim 1, wherein the encasement portion comprises polyether-polyurea copolymer synthetic fibers.

3. The apparatus of claim 1, wherein the encasement portion comprises natural fibers that allow the encasement portion to be stretched over the seatback or the other substantially vertically upright apparatus.

4. The apparatus of claim 1, wherein the front-facing side and the rear-facing side of the encasement portion comprises two or more segments of fabric, and wherein the two or more fabric segments are designed to be attached to each other after the segments are positioned around the seatback or the substantially vertically upright apparatus.

5. The apparatus of claim 4, wherein the segments are attached to each other using hook and loop fasteners affixed to both the front-facing and rear-facing sides of the encasement portion.

6. The apparatus of claim 4, wherein the segments are attached to each other using zippered attachment mechanisms.

7. The apparatus of claim 1, wherein the book holder support platform is vertically raised and lowered to a desired viewing height.

8. The apparatus of claim 7, wherein the front-facing side of the encasement portion includes a plurality of attachment fasteners positioned at different vertical heights along the front-facing side of the encasement portion, and wherein the fasteners allow the book holder support platform to be hingeably attached at different heights of the front-facing side of the encasement portion to suit the viewing needs of the user.

9. The apparatus of claim 8, wherein the attachment fasteners comprise hook and loop fasteners.

10. The apparatus of claim 1, wherein the book holder support platform includes a ledge or tray that prevents the book or other handheld object from falling during use.

11. The apparatus of claim 7, wherein the book holder support platform is attached to the encasement portion using a rail-based approach, wherein a rail is affixed to the front-facing side of the encasement portion, wherein the rail comprises a plurality of rail segments, and wherein the book holder support platform is detachably attached at a desired rail segment of the rail thereby vertically raising or lowering the book holder support platform to the desired viewing height.

12. The apparatus of claim 11, wherein the rail is vertically affixed to the front-facing side of the encasement portion such that a top segment of the rail is positioned proximate a top portion of the seatback and a bottom segment of the rail is positioned proximate a bottom portion of the seatback.

13. The apparatus of claim 7, wherein the book holder support platform is attached to the encasement portion using a rail-based approach, wherein the support platform is rigidly affixed to a rail that is slidably attached to the front-facing side of the encasement portion, and wherein the rail is slid along the front-facing side of the encasement portion thereby vertically raising or lowering the book holder support platform to the desired viewing height.

14. An apparatus for holding a book or other handheld object for viewing by a user, the apparatus comprising:
(a) an encasement means for encasing a book holder support structure around a seatback or other substantially vertically upright apparatus, wherein the encasement means comprises substantially stretch fabric, and wherein the encasement means includes a front-facing side and a rear-facing side, and wherein, during use, the encasement means is positioned over or around a seatback or other substantially vertically upright apparatus such that the encasement means fits snugly to the seatback or the substantially vertically upright apparatus, thereby providing a secure and stable attachment surface; and
(b) a supporting means for supporting a book or other hand-held object, wherein the book supporting means is hingeably attached to the front-facing side of the encasement means, and wherein the book supporting means provides a substantially horizontal surface upon which a book or other handheld object may be placed, and wherein the book supporting means may be vertically raised, lowered, or tilted to a desirable viewing angle by the user.

15. A method of holding a book or other handheld object for viewing by a user, the method comprising:
(a) stretching an encasement portion of a book holder over or around a seatback or other substantially vertically upright apparatus such that the encasement portion fits snugly to the seatback or the substantially vertically upright apparatus, thereby providing a secure and stable attachment surface, wherein the encasement portion includes a front-facing side and a rear-facing side; and
(b) attaching a book holder support platform to the front-facing side of the encasement portion, wherein the book holder support platform provides a substantially horizontal surface upon which a book or other handheld object may be placed, and wherein the book holder support platform may be vertically raised, lowered, or tilted to a desirable viewing angle by the user.

16. The apparatus of claim 2, wherein the synthetic fibers include at least one of lycra, elastane, or spandex.

17. The apparatus of claim 2, wherein the synthetic fibers have fibers having an elastane content.

\* \* \* \* \*